United States Patent
Matsunaga et al.

[11] Patent Number: 5,854,360
[45] Date of Patent: Dec. 29, 1998

[54] CURABLE COMPOSITION

[75] Inventors: Shunji Matsunaga; Tetsuo Itoh, both of Kyoto, Japan

[73] Assignee: Sanyo Chemical Industries Ltd., Kyoto, Japan

[21] Appl. No.: 663,061

[22] PCT Filed: Oct. 20, 1995

[86] PCT No.: PCT/JP95/02173

§ 371 Date: Jun. 18, 1996

§ 102(e) Date: Jun. 18, 1996

[87] PCT Pub. No.: WO96/12748

PCT Pub. Date: May 2, 1996

[30] Foreign Application Priority Data

Oct. 21, 1994 [JP] Japan .............................. HEI6-282549

[51] Int. Cl.$^6$ ..................................................... C08G 18/00
[52] U.S. Cl. ........................................... 525/452; 525/453
[58] Field of Search ..................................... 525/452, 453

[56] References Cited

U.S. PATENT DOCUMENTS

| | | | |
|---|---|---|---|
| 3,954,684 | 5/1976 | Farrissey, Jr. et al. | 260/2.5 |
| 4,040,992 | 8/1977 | Bechara et al. | 521/117 |
| 4,136,240 | 1/1979 | Zimmerman et al. | 521/118 |
| 4,186,255 | 1/1980 | Klein et al. | 521/128 |
| 4,195,150 | 3/1980 | Gajewski et al. | 528/52 |
| 4,395,530 | 7/1983 | Hammond | 528/44 |
| 4,480,071 | 10/1984 | Natarajan et al. | 524/593 |
| 4,540,516 | 9/1985 | Van Geenen | 260/239.3 |
| 4,780,485 | 10/1988 | Ashida | 521/118 |
| 4,806,585 | 2/1989 | Nakayama et al. | 524/376 |
| 5,066,722 | 11/1991 | Nakano et al. | 525/162 |
| 5,288,864 | 2/1994 | Nichols et al. | 521/128 |
| 5,563,180 | 10/1996 | Skowronski et al. | 521/125 |

FOREIGN PATENT DOCUMENTS

| | | |
|---|---|---|
| 0 139 895 A2 | 5/1985 | European Pat. Off. . |
| 0 512 213 A1 | 11/1992 | European Pat. Off. . |
| 0 533 071 A1 | 3/1993 | European Pat. Off. . |
| 1-319521 A | 12/1989 | Japan . |
| 3-7249 A | 1/1991 | Japan . |
| 7-233233 A | 9/1995 | Japan . |
| 2 161 475 | 1/1986 | United Kingdom . |

*Primary Examiner*—Randy Gulakowski
*Attorney, Agent, or Firm*—Kubovcik & Kubovcik

[57] ABSTRACT

A curable composition comprising Component (A) a blocked polyisocyanate compound, Component (B) an active hydrogen compound having at least 2 active hydrogen atom-containing groups in the molecule, and Component (C) a catalyst expressed by the following formula (1), $$(R_1, R_2, R_3, R_4)N^+Y^- \quad (1)$$

wherein $R_1$, $R_2$, $R_3$ and $R_4$ denote hydrocarbon groups of 1 to 18 carbon atoms which are non-reactive to isocyanates and may be the same or different, and said groups may form heterocyclic rings via oxygen or nitrogen atoms, and $Y^-$ denotes an anion of a hydroxide, an alkoxide, an aryloxy or a carbonate, or an anion of a carboxylate, a sulfonate, a phosphate or a borate which may contain hydrocarbon groups. The composition is suitable for chipping-resistant coating material for automobiles.

19 Claims, No Drawings

CURABLE COMPOSITION

FIELD OF THE INVENTION

This invention relates to a curable composition comprising a blocked polyisocyanate compound, specifically to a (curable) resin composition which is suitable for chipping-resistant coating materials for vehicles such as automobiles.

DESCRIPTION OF THE PRIOR ART

It has previously been known that, in curable compositions composed mainly of a blocked polyisocyanate compound which are frequently used for urethane coating materials, particularly chipping-resistant coating materials, organic heavy metal compounds such as zinc octylate, lead octylate, tin octylate, and the like, and tertiary amine compounds such as triethylenediamine, triethylamine, and the like, are used as catalysts, in order to lower the dissociation temperature of the blocked polyisocyanate compound to impart thereto a low-temperature curing property.

However, the use of a tertiary amine catalyst in the above-mentioned curable composition causes difficulties in attaining a sufficiently low dissociation temperature of the blocked polyisocyanate compound, and the use of an organic heavy metal catalyst, while being effective in lowering the dissociation temperature thereof to impart a low-temperature curing property, causes yellowing of the cured coating and also a heavy metal pollution problem. In order to solve these problems, JP A 6-192364 discloses the use of hydroxyl-containing quaternary ammonium salt compounds as catalysts capable of lowering the dissociation temperature of the blocked isocyanate compounds. However, hydroxyl-containing quaternary ammonium salt compounds, while being capable of lowering the dissociation temperature, are not satisfactory in curing properties.

DISCLOSURE OF THE INVENTION

The an object of the invention is to find a catalyst which is capable of lowering the dissociation temperatures of blocked polyisocyanate compounds and imparting thereto excellent low-temperature curing properties, and to provide a curable composition having no environmental problems.

In order to achieve the above objective, the invention provides a curable composition containing the components (A), (B) and (C) described in the following;

(A) a blocked polyisocyanate compound, (B) an active hydrogen compound containing at least two active hydrogen atom-containing groups in the molecule, and (C) a catalyst expressed by the following general formula

$$(R_1, R_2, R_3, R_4)N^+Y^- \qquad (1)$$

wherein $R_1$, $R_2$, $R_3$ and $R_4$ denote hydrocarbon groups of 1 to 18 carbon atoms which are non-reactive to isocyanates and may be the same or different, and said groups may form a heterocyclic ring via an oxygen or nitrogen atom, and $Y^-$ denotes an anion of a hydroxide, an alkoxide, an aryloxy or a carbonate; or an anion of a carboxylate, a sulfonate, a phosphate or a borate which may contain a hydrocarbon group.

The curable composition of the invention, as compared with those using conventional tertiary amine catalysts, can lower the temperature to start curing (dissociation temperature) by at least 10° C., thus effecting low-temperature curing to give excellent coating properties. When compared with those using organic heavy metal catalysts, it gives a superior anti-yellowing property of the cured coat and a superior storage stability as a coating material, and meets a high-level of safety standards, being free from environmental problems such as water pollution. Exhibiting the excellent properties thus far explained, the curable composition of the invention can be used with advantage for chipping-resistant coating materials for vehicles such as automobiles.

BEST MODE OF CARRYING OUT THE INVENTION

First, each of the components (A), (B) and (C) constituting the curable composition of the invention will be explained.

Organic polyisocyanates constituting the blocked polyisocyanate compound (A) include, for example, monomeric polyisocyanates, polymeric polyisocyanates, NCO group-terminated polyurethane prepolymer, and mixtures thereof.

Among these organic polyisocyanates, monomeric polyisocyanates include, for example, aliphatic polyisocyanates such as hexamethylenediisocyanate (HDI) and lysine diisocyanate; alicyclic polyisocyanates such as dicyclohexylmethane diisocyanate (hydrogenated MDI), isophorone diisocyanate (IPDI), cyclohexane diisocyanate (CHDI), hydrogenated tolylene diisocyanate and hydrogenated xylylene diisocyanate; aromatic polyisocyanates such as tolylene diisocyanate (TDI), diphenylmethane diisocyanate (MDI), naphthylene diisocyanate (NDI), xylylene diisocyanate (XDI) and α, α, α', α'-tetramethylxylylene diisocyanate (TMXDI); and mixtures thereof.

Examples of polymeric polyisocyanates are trimers of the above-mentioned monomeric polyisocyanates, modified polyisocyanates having biuret, urethodione and/or carbodiimide groups, and mixtures thereof.

Examples of NCO group-terminated polyurethane prepolymer are reaction products of an excess monomeric or polymeric polyisocyanate with a polyether polyol, a polyester polyol, a polymer polyol, a polycarbonate polyol, or mixtures thereof.

Prepolymers used are those reacted at an equivalent weight ratio of NCO to OH of usually 1.2 to 3.0, preferably 1.5 to 2.2. The number-average molecular weight of the prepolymers used is usually 500 to 10,000, preferably 700 to 8,000. In general cases, when the number-average molecular weight is smaller than 500, coatings become hard and brittle, thus lowering the chipping-resistant property thereof. When the number-average molecular weight is larger than 10,000, good adhesion to the substrates can not be obtained. The amount of the NCO group in the prepolymer is usually 1 to 20% by weight, preferably 2 to 15% by weight.

As blocking agents constituting the blocked polyisocyanate compound (A) there are included, for example, oxime compounds including ketoximes such as acetoxime, methyl ethyl ketoxime (MEK oxime) and methyl isobutyl ketoxime (MIBK oxime); lactam compounds such as ε-caprolactam, δ-valerolactam and γ-butyrolactam; phenol compounds such as phenol, m-cresol and xylenol; active methylene compounds including malonic diesters such as diethyl malonate and the like, acetylacetone and acetoacetic esters such as ethyl acetoacetate and the like; alcohol compounds such as methanol, ethanol and n-butanol; hydroxyl-containing ether compounds such as methyl cellosolve, butyl cellosolve and ethyl carbitol; hydroxyl-containing ester compounds such as ethyl lactate and amyl lactate; mercaptan compounds such as butyl mercaptan and hexyl mercaptan; acid amide compounds such as acetanilide, acrylamide and dimeric acid amide; imidazole compounds such as imidazole and 2-ethylimidazole; acid imide compounds such as succinic imide and phthalimide; and mixtures of more than one kind thereof.

Preferable among these compounds are oxime compounds, lactam compounds and phenol compounds, particularly preferable are methyl ethyl ketoxime, ε-caprolactam and xylenol.

The component (A) can be prepared according to known methods, for example, by reacting a blocking agent with an organic polyisocyanate at 50° to 150° C., at an equivalent weight ratio of the NCO group of the organic polyisocyanate to the active hydrogen group of the blocking agent of usually 1 to 2, preferably 1.05 to 1.5.

As the component (B) are included, for example, polyhydric alcohols, a polyether polyol obtained by adding ethylene oxide and/or propylene oxide to a polyhydric alcohol, an epoxy resin modified polyol obtained by reacting a bisphenol type epoxy resin with an amine such as diethanolamine, a polyester polyol obtained by condensation polymerization of a polybasic acid with a polyhydric alcohol, polylactone polyols, polycarbonate polyols, an acrylic polyol such as a copolymer of a vinyl monomer containing a hydroxyl group such as β-hydroxyethyl (meth) acrylate with other vinyl monomers, polybutadiene polyols, a partially saponified compound of an ethylene-vinylacetate copolymer, a polyoxyalkylene polyamine described in JP B 5-73793, an alkylene oxide adduct of a (poly)alkylene polyamine, a ketiminized compound of a polyoxyalkylene polyamine, a ketiminized compound of a polyamide compound, a ketiminized compound of a (poly)alkylene polyamine, and mixtures thereof.

Further, in the compounds expressed by the formula (1) that are used as the component (C), $R_1$, $R_2$, $R_3$ and $R_4$, representing hydrocarbon groups having 1 to 18 carbon atoms which are non-reactive to isocyanates and which may form a heterocyclic ring containing an oxygen or nitrogen atom, include, for example, aliphatic alkyl groups such as methyl, ethyl, propyl, hexyl, decyl, lauryl and stearyl; alicyclic alkylene groups such as cyclotetramethylene, cyclopentamethylene and cyclohexamethylene; aralkyl groups such as benzyl; aryl groups such as phenyl and naphthyl; and heterocyclic groups formed by including oxygen or nitrogen atoms such as oxacyclohexylene, azacyclohexylene, 1,5-diazabicyclo-(4,3,0)-5-nonenylene, 1,8-diazabicyclo-(5,4,0)-7-undecelene, cyclohexa-1,3-dienylene, 4-dimethylamino-cyclohexa-1,3-dienylene, methylcyclohexa-1,3-dienylene, cyclopenta-1,3-dienylene azamethylcyclopenta-1,3-dienylene, azaethylcycloazapenta-1,3-dienylene, azapentamonoenylene, azamethylpentamonoenylene and azadimethylpentamonoenylene groups. Particularly preferable are aliphatic alkyl groups and heterocyclic groups formed by including oxygen or nitrogen atoms.

Alkoxide anion in $Y^-$ include, for example, methoxy and ethoxy anions. As aryloxy anion are included anions of phenolate, resorcinate and naphtholate. Examples of carboxylate anion which may contain a hydrocarbon group are aliphatic monocarboxylate anions such as anions of formate, acetate, propionate, octylate, 2-ethylhexoate and laurate; aliphatic polycarboxylate anion such as anions of oxalate, malonate, succinate, glutarate and adipate; aromatic monocarboxylate anion such as anions of benzoate, toluylate, naphthoate and ethyl benzoate; and anions of phthalate, isophthalate, terephthalate, nitrophthalate and trimellitate. As sulfonate anion which may contain a hydrocarbon group are, for example, anions of benzenesulfonate, toluenesulfonate and alkylbenzenesulfonate, and as phosphate anion which may contain a hydrocarbon group are, for example, dialkylphosphate ester anion. Further, borate anion which may contain a hydrocarbon group include anion obtained by removing protonic hydrogen atoms from the complexes of a monovalent or divalent alcohol with boric acid, which is expressed, for example, by the following formulas,

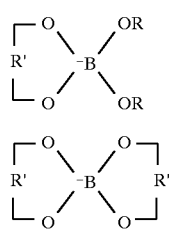

wherein R denotes a methyl, an ethyl, a propyl or a benzyl group and R' an ethylene or a propylene group.

Preferable as $Y^-$ are aliphatic or aromatic monocarboxylate anions, and particularly preferable are anions of octylate and formate.

One of the preferable compounds that are expressed by the general formula (1) is a quaternary ammonium carboxylate salt, typical examples of which are methyltriethylammonium octylate salt, N-8-methyl-1,8-diazabicyclo[5,4,0]-7-undecene octylate salt and 1,2,3,4-tetramethyl-imidazolinium octylate salt. A quaternary ammonium carboxylate salt can be obtained, for example, ① by reacting a quaternary ammonium hydroxide with an organic acid or ② by reacting a tertiary amine with a carbonic acid diester to obtain a quaternary ammonium carbonate which is then reacted with an organic acid. The method ② is preferable, because thereby a product of a high purity can easily be obtained. In the preparation method ②, preferably used as tertiary amines are trimethylamine, triethylamine, 1,5-diazabicyclo[4,3,0]-5-nonene, 1,8-diazabicyclo-[5,4,0]-7-undecene or 1,2,4-trimethylimidazoline. Preferable as organic acids are organic carboxylic acids, among which aliphatic monocarboxylic acids, particularly formic acid or octylic acid are particularly preferred.

A quaternary ammonium sulfonate or phosphate salt can be obtained by reacting a tertiary amine with a carbonic acid diester to obtain a quaternary ammonium carbonate which is then reacted either with a sulfonic acid or dialkylphosphoric acid ester.

A quaternary ammonium borate salt can be obtained, for example, as described in U.S. Pat. No. 4,192,759, by reacting a complex of boric acid and a monovalent or divalent alcohol with a quaternary ammonium hydroxide.

The content of each component of the curable composition of the invention will next be explained. In 100% by weight of the curable composition are preferably contained 60 to 95% by weight of the blocked polyisocyanate (Component A) and 35% by weight or less of the active hydrogen compound having at least 2 active hydrogen groups in the molecule (Component B), the ratio of Component A to Component B being such that the equivalent weight ratio of the NCO group to the active hydrogen group is preferably 1 to (0.1 to 2.5), particularly preferably 1 to (0.5 to 1.5). When the equivalent weight ratio of the active hydrogen group is smaller than 0.1 or larger than 2.5, curing tends usually to become unsatisfactory. The amount to be used of the catalyst expressed by the general formula (1) (Component C) is usually 0.01 to 5% by weight, preferably 0.05 to 2% by weight based on the sum total of the weight of Components (A), (B), and (C).

The curable composition of the invention is cured by heating usually at 90° C. to 180° C., preferably at 100° to 170° C., more preferably at 110° to 150° C., for 10 to 80 minutes, preferably for 10 to 60 minutes.

To the curable composition of the invention can be added, according to need, pigments, fillers, solvents, and the like. As pigments are included, for example, inorganic pigments such as titanium oxide, carbon black, red oxide and oxide yellow, and organic pigments such as phthalocyanine blue and phthalocyanine green. Examples of fillers are clay, calcium carbonate, barium sulfate, talc, alumina, silica, barytes, vermiculite and china clay. As solvents are included, for example, aromatic hydrocarbon solvents such as toluene, xylene and trimethylbenzene; ester solvents such as ethyl acetate, butyl acetate and "DBE" (a mixture of dimethyl succinate, dimethyl glutarate and dimethyl adipate); ether solvents such as Cellosolve acetate and Carbitol acetate; ketone solvents such as methyl ethyl ketone and cyclohexanone; and mixed solvents of more than one kind thereof.

The curable composition of the invention can also be combined, according to need, with various kinds of additives, for example, natural resins or synthetic resins such as vinyl chloride resin, vinyl chloride sol, phenol resin, ketone resin, synthetic rubber, unsaturated polyester resin, epoxy resin, melamine resin, urea resin and rosin resin; leveling agents; anti-sagging agents; anti-foaming agents; surfactants; curing accelerators; anti-cissing agents; pigment dispersing agents and antistatic agents.

The method of preparing chipping-resistant coating materials for vehicles by using the curable composition of the invention will be explained in detail. Typical coating material can be obtained by mixing the components described below with a mixing apparatus, for example, a DESPA (a high shear mixer manufactured by ASADA Iron Works Co., Ltd.) a three-roll mill, a ball mill, a steel mill, a pebble mill, an attritor, a sand mill, a sand grinder, a roll mill, a pot mill and a bladed high-speed agitator. Here, the sum total of the weights of Components A, B and C is expressed as 100% by weight.

Component (A): 10 to 70% by weight, preferably 20 to 60% by weight

Component (B): 1 to 30% by weight, preferably 2 to 20% by weight

Component (C): 0.01 to 5% by weight, preferably 0.05 to 2% by weight

Pigments: 5 to 70% by weight, preferably 10 to 60% by weight

Fillers: 5 to 70% by weight, preferably 10 to 60% by weight

Solvents: 10 to 70% by weight, preferably 20 to 50% by weight

Various Additives: 0.5 to 10% by weight, preferably 1 to 7% by weight

The coating materials described above are used for coating chemically treated or non-treated iron plates, galvanized iron plates, and anionic electrodeposited or cationic electrodeposited iron plates. They are also used to form intercoat or topcoat layers on iron plates coated with other coating material.

Coating can be carried out by brushing, by roller coating, by spatula coating, with the use of an air-spray coater, an airless spray coater and a hot airless spray coater. The use of an airless spray coater is preferable, because by the use of an air-spray coater it takes a longer time to obtain necessary coating thicknesses. When an airless spray coater is used, necessary coating thicknesses can be obtained usually by 1 stroke or 2 strokes depending on the stroke speed.

Industrial Applicability

The curable composition of the invention can be used for chipping-resistant coating materials for automobiles, coating materials for electric wires, coating materials for pre-coated metals, and the like, being particularly suitable for chipping-resistant coating materials for automobiles. When used for chipping-resistant coating materials for automobiles, baking temperature (curing temperature) is usually 90° C. or higher, preferably 100° to 170° C., particularly preferably 110° to 150° C. Baking time (curing time) is usually less than 120 minutes, preferably 10 to 60 minutes. Dry coating thickness for chipping-resistant coating material is usually 20 to 500 µm, preferably 50 to 300 µm. When the coating thickness is less than 20 µm, the desired chipping-resistant property cannot be obtained. On the other hand, when the coating thickness exceeds 500 µm, difficulties like skim and sag tend to arise.

EXAMPLES

The invention will be explained in more detail with reference to the following examples. However, the invention is not limited to the specific embodiments. In the examples, the word "parts" means "parts by weight" and "%" means "% by weight".

Testing methods used in the present examples will be explained.

(1) Temperature of starting curing (Examples 1 to 4 and Comparative Examples 1 to 2)

Each curable composition was coated onto a plate to prepare a test piece having a dry coating thickness of 100 µm, which was mounted to a rigid pendulum type viscoelastometer (Rheovibron DDV-OPA3, manufactured by Orientech, Inc.), and measurements were made under the following temperature rise condition. The temperature at which logarithmic decrement starts decreasing (the pendulum is damped by an increase in viscosity due to the start of curing) was defined as the temperature of starting curing. The lower the temperature of starting curing, the lower the temperature of dissociation and, accordingly, the better the low-temperature curing property.

Condition of temperature rise 1: Temperature was raised from room temperature to 80° C. in 3 minutes and then from 80° C. to 200° C. in 24 minutes.

(2) Time of starting curing (Examples 9 to 10 and Comparative Examples 5 to 6)

Each curable composition was coated onto a plate to prepare a test piece having in a dry coating thickness of 100 µm, which was mounted to the rigid pendulum type viscoelastometer mentioned above, and measurements were made under the following temperature rise conditions. For each temperature rise condition, the time required from the moment when the temperature reached 120° C. to the moment when logarithmic decrement starts decreasing (when the pendulum is damped by an increase in viscosity due to the start of curing) was defined as the time of starting curing. The shorter the time of starting curing, the better the curing property.

Condition of temperature rise 2: Temperature was raised from room temperature to 120° C. in 2 minutes and then kept at 120° C.

Condition of temperature rise 3: Temperature was raised from room temperature to 130° C. in 2 minutes and then kept at 130° C.

Condition of temperature rise 4: Temperature was raised from room temperature to 140° C. in 2 minutes and then kept at 140° C.

(3) Gel fraction

Each curable composition was poured into a tray in a dry coating thickness of 200 to 400 μm, and the composition was then cured under predetermined conditions, the temperatures and times thereof being described in Tables 1 and 3, to obtain a film. The film of the curable composition thus obtained was cooled down to room temperature followed by cutting into rectangular pieces of ca. 1 cm sides, wherefrom an amount of ca. 1 g was weighed (S g) and put into an Erlenmeyer flask which had previously been dried and weighed ($T_1$ g). Into the flask was poured 50 ml of an equal volume mixture of methanol and acetone, which was then heated under reflux at ca. 60° C. for 3 hours followed by filtering the sample with a filter paper which had previously been dried and weighed ($T_2$ g). The insoluble matter and the filter paper were put into the Erlenmeyer flask, which was then dried at 105° C. for 45 minutes. After being cooled down to room temperature, the whole Erlenmeyer flask was weighed (G g). By using the results of the weight measurements, gel fraction (%) was determined from the following equation. The larger the gel fraction, the more complete the degree of curing.

$$Gel\ fraction\ (\%) = [\{G - (T_1 + T_2)\}/S] \times 100$$

(4) Mechanical Properties

Each curable composition was poured into a tray in a dried coating thickness of 150 to 200 μm, and the composition was then cured by heating at 140° C. for 40 minutes to obtain a film. The thus obtained film was cooled down to room temperature followed by punching into a No.3 dumbbell in accordance with JIS K-6251, and measurements were made at a temperature of 20° C. for the tensile break strength and elongation thereof.

(5) Anti-yellowing Property

Each curable composition was poured into a tray in a dry coating thickness of 150 to 200 μm, and the composition was then cured under the curing conditions described in Table 1 to obtain a film. The thus obtained film was cooled down to room temperature, and measurements were made for the Yellow Index thereof by means of a multi-light source spectrocolorimeter (MSC-2, manufactured by Suga Testing Machines, Inc.). The smaller the value, the better the anti-yellowing property. Samples that are denoted "Non-measurable" in Tables 1 and 3 are those which could not be measured because the resin was in a half-cured state exhibiting a high tackiness.

(6) Appearance of Coating Film (Coating Film Properties)

Onto a steel plate, which had been electrodeposited with an epoxy-type cationic electrodeposition coating material followed by curing by baking (hereafter referred to as electrodeposited plate), was sprayed with an airless spray-gun the coating material of Examples or Comparative Examples (hereafter referred to as chipping-resistant coating material) in a coating thickness after drying of 150 μm. The plate was then heated at 140° C. for 20 minutes, and the coating film thus obtained was submitted to inspection for visual appearance such as blister, skim, pinhole, and so on. Criteria of appearance are as follows.

⊚; No blisters, voids, pinholes, wrinkles or sags are observed.

○; Some voids are observed, however they are very small and practically of no problem.

×l Any one of blisters, voids, pinholes, wrinkles and sags are observed in large numbers.

(7) Chipping-resistant Property

An electrodeposited plate of 100×100×0.8 mm mentioned above was coated with chipping-resistant coating material in a coating thickness after drying of 150 μm followed by heating at 140° C. for 20 minutes. The thus obtained coated plate was then coated with a melamine alkyd resin type intercoating material in a coating thickness after drying of 30 μm followed by heating at 140° C. for 20 minutes. Then, according to JIS B-1181, onto the thus obtained intercoat coated plate was dropped, from a height of 2 m through a tube of 20 mm diameter, iron hexagon nuts of the 3rd kind-M-4 shape, while the coated plate was being held at an angle of 450 with the falling direction of the nut. Measurements were made for the total weight of the nuts (Kg) required to make a mark, by the impact of the falling nuts, on the coating film that reaches as deep as the metal surface. The larger the value, the better the chipping-resistant property.

(8) Storage Stability

Chipping-resistant coating material was stored at 40° C. for 10 days and measurements were made for the rate of increase of viscosity thereof during the storage period. The smaller the rate of increase, the better the storage stability.

Preparation Example 1

An urethane prepolymer of NCO content of 4.8% was obtained by reacting 273 parts of dicyclohexyl-methane diisocyanate, 208 parts of polytetramethylene glycol (number average molecular weight: 1,000), 28 parts of trimethylolpropane and 400 parts of an aromatic solvent (Pegasole R-100, manufactured by Mobil Oil, Inc.), under a stream of nitrogen at 80° to 100° C. for 8 hours. To the prepolymer obtained was added 91 parts of methyl ethyl ketoxime, and the mixture was reacted at 60° to 80° C. for 2 hours. By inspection of the infrared spectrum of the reactant, absence of isocyanate group therein was confirmed, thus a blocked polyisocyanate (A-1; Solid content 60%) was obtained.

Preparation Example 2

An urethane prepolymer of NCO content of 5.7% was obtained by reacting 203 parts of tolylene diisocyanate, 234 parts of polytetramethylene glycol (number-average molecular weight; 1,000), 31 parts of trimethylolpropane and 400 parts of an ester solvent (DBE, manufactured by Du Pont, Inc.), under a stream of nitrogen at 60° to 80° C. for 6 hours. To the prepolymer was added 135 parts of ε-caprolactam, and the mixture was reacted at 80° to 100° C. for 3 hours. By inspection of the infrared spectrum of the reactant, absence of isocyanate group therein was confirmed, thus a blocked polyisocyanate (A-2; Solid content 60%) was obtained.

Preparation Example 3

Into an autoclave equipped with a stirrer were charged triethylamine (1 mole), dimethyl carbonate (1.5 mole) and methanol (2.0 mole), which were reacted at a reaction temperature of 110° C. for 12 hours to obtain a methanol solution of methyltriethylammoniummethyl carbonate. To the thus obtained solution was added octylic acid (1 mole) followed by removing carbon dioxide gas evolved and methanol to obtain methyltriethylammonium octylate (C-1).

Preparation Example 4

In the same way as in Preparation Example 3, except that 1 mole of 1,8-diazabicyclo[5,4,0]-7-undecene was used instead of triethylamine, was obtained N-8-methyl-1,8-diazabicyclo[5,4,0]-7-undecene octylate (C-2).

Preparation Example 5

In the same way as in Preparation Example 3, except that formic acid was used instead of octylic acid, was obtained methyltriethylammonium formate (C-3).

Examples 1 to 4 and Comparative Examples 1 to 2

Components described in Table 1 were mixed together and measurements were made on these mixtures for temperature of starting curing according to the testing method described above. Measurements were also made, according to the testing methods described above, for gel fraction, mechanical properties and anti-yellowing property thereof under the curing condition described in Table 1. The results are tabulated in Table 1.

Examples 5 to 8 and Comparative Example 3 to 4

Components described in Table 2 were mixed together and measurements were made on coating films obtained for appearance and chipping-resistant property according to the testing methods described above. Testing for storage stability of coating material was also made. The results are tabulated in Table 2.

Examples 9 to 10 and Comparative Examples 5 to 6

Components described in Table 3 were mixed together and measurements were made on these mixtures for time of starting curing according to the testing method described above. Measurements were also made, on cured specimens obtained, according to the testing methods described above, for mechanical properties and anti-yellowing property. The results are tabulated in Table 3. In the examples and comparative examples B-1 is a propylene oxide adduct of diethylenetriamine (MW=about 400) and B-2 is polyoxypropylene triamine (amine value=360).

TABLE 1

| Names of the Components Used | Example | | | | Comparative Examples | |
|---|---|---|---|---|---|---|
| | 1 | 2 | 3 | 4 | 1 | 2 |
| Blocked Polyisocyanate (A) | | | | | | |
| A-1 | 100 | 100 | | | 100 | 100 |
| A-2 | | | 100 | 100 | | |
| Active Hydrogen Compound (B) | 8.3 | 8.3 | 9.4 | 9.4 | 8.3 | 8.3 |
| B-1 | | | | | | |
| Catalyst (C) | | | | | | |
| C-1 | 0.35 | | 0.35 | | | |
| C-2 | | 0.35 | | 0.35 | | |
| Triethylenediamine | | | | | 0.35 | |
| Lead Octylate | | | | | | 0.35 |
| DBE | 28.7 | 28.7 | 29.8 | 29.8 | 28.7 | 28.7 |
| Sum Total | 137.3 | 137.3 | 137.3 | 137.3 | 137.3 | 137.3 |
| Curing Property Temperature of Starting Curing (°C.) | 159 | 162 | 160 | 163 | 173 | 160 |
| Gel Fraction (%) Respective Curing Condition | | | | | | |
| 130° C. × 30 min | 75 | 70 | 73 | 72 | 35 | 73 |
| 140° C. × 30 min | 85 | 83 | 84 | 81 | 59 | 86 |
| 150° C. × 30 min | 93 | 91 | 90 | 90 | 70 | 94 |
| 160° C. × 30 min | 98 | 97 | 97 | 97 | 76 | 98 |
| Mechanical Properties | | | | | | |
| Cured Specimen Tensile Strength (Kg/cm$^2$) | 286 | 273 | 306 | 295 | 171 | 292 |
| Elongation (%) | 120 | 130 | 115 | 120 | 125 | 110 |
| Anti-yellowing Property Curing Conditions | | | | | | |
| 130° C. × 40 min | 5 | 6 | 7 | Unmeasurable | Unmeasurable | 11 |
| 140° C. × 40 min | 8 | 9 | 9 | 8 | Unmeasurable | 24 |
| 150° C. × 40 min | 10 | 10 | 11 | 12 | 27 | 30 |
| 160° C. × 40 min | 16 | 15 | 14 | 15 | 39 | 44 |

Note: Amount of components are expressed in parts by weight

TABLE 2

| Names of the Components Used | Example | | | | Comparative Examples | |
|---|---|---|---|---|---|---|
| | 5 | 6 | 7 | 8 | 3 | 4 |
| Blocked Polyisocyanate (A) | | | | | | |
| A-1 | 100 | 100 | | | 100 | 100 |
| A-2 | | | 100 | 100 | | |
| Active Hydrogen Compound (B) | 8.3 | 8.3 | 9.4 | 9.4 | 8.3 | 8.3 |
| B-1 | | | | | | |

TABLE 2-continued

|  | Example | | | | Comparative Examples | |
| --- | --- | --- | --- | --- | --- | --- |
| Names of the Components Used | 5 | 6 | 7 | 8 | 3 | 4 |
| Catalyst (C) | | | | | | |
| C-1 | 0.35 | | 0.35 | | | |
| C-2 | | 0.35 | | 0.35 | | |
| Triethylenediamine | | | | | 0.35 | |
| Lead Octylate | | | | | | 0.35 |
| Filler, Pigment | | | | | | |
| Calcium Carbonate | 97.4 | 97.4 | 98.9 | 98.9 | 97.4 | 97.4 |
| Titanium Oxide | 5.1 | 5.1 | 5.2 | 5.2 | 5.1 | 5.1 |
| Anti-foaming Agent | 0.5 | 0.5 | 0.5 | 0.5 | 0.5 | 0.5 |
| DBE | 33.2 | 33.2 | 34.5 | 34.5 | 33.2 | 33.2 |
| Sum Total | 244.9 | 244.9 | 248.9 | 248.9 | 244.9 | 244.9 |
| Coating Film Properties | ⊚ | ⊚ | ⊚ | ⊚ | X | ○ |
| Coating Film Appearance | | | | | | |
| Chipping Resistant Property (Kg) | 28 | 25 | 28 | 26 | 12 | 28 |
| Storage Stability Rate of Viscosity Increase of Coating (%) | 25 | 22 | 24 | 23 | 20 | 45 |

Note: Amount of components are expressed in parts by weight

TABLE 3

| Names of the | Example | | Comparative Examples | |
| --- | --- | --- | --- | --- |
| Components Used | 9 | 10 | 5 | 6 |
| Blocked Polyisocyanate (A) | 100 | 100 | 100 | 100 |
| A-1 | | | | |
| Active Hydrogen Compound (B) | 16.2 | 16.2 | 16.2 | 16.2 |
| B-2 | | | | |
| Catalyst (C) | | | | |
| C-1 | 0.35 | | | |
| C-3 | | 0.35 | | |
| 2-Hydroxypropyltrimethyl-ammonium Octylate (TMR) | | | 0.35 | |
| 2-Hydroxypropyltrimethyl-ammonium Formate (TMR-2) | | | | 0.35 |
| DBE | 36.6 | 36.6 | 36.6 | 36.6 |
| Sum Total | 153.2 | 153.2 | 153.2 | 153.2 |
| Curing Property | | | | |
| Time of Starting Curing (min) | | | | |
| Temperature Rise Condition-2 | 15 | 12 | 30 | 50 |
| Temperature Rise Condition-3 | 9 | 7 | 32 | 28 |
| Temperature Rise Condition-4 | 5 | 4 | 20 | 15 |
| Mechanical Properties | | | | |
| Resin Properties | | | | |
| Tensile Strength (Kg/cm$^2$) | 257 | 262 | 120 | 135 |
| Elongation (%) | 212 | 208 | 87 | 90 |
| Anti-yellowing Property | | | | |
| Curing Condition | | | | |
| 130° C. × 40 min | 8 | 7 | Unmeasurable | Unmeasurable |
| 140° C. × 40 min | 10 | 11 | 15 | 12 |
| 150° C. × 40 min | 12 | 12 | 17 | 15 |
| 160° C. × 40 min | 18 | 17 | 20 | 21 |

Note: Amount of components are expressed in parts by weight

We claim:

1. A curable composition which comprises (A) a blocked polyisocyanate compound, (B) an active hydrogen compound having at least 2 active hydrogen atom-containing groups in the molecule, and (C) a catalyst expressed by the following general formula (1), $$(R_1, R_2, R_3, R_4)N^+Y^- \quad (1)$$

wherein $R_1$, $R_2$, $R_3$, and $R_4$ denote hydrocarbon groups of 1 to 18 carbon atoms which are nonreactive to isocyanates and may be the same or different, and said groups may form one or more heterocyclic rings via an oxygen or nitrogen atom, and $Y^-$ denotes an anion of a hydroxide, an alkoxide, an aryloxy or a carbonate; or an anion of a carboxylate, a sulfonate, a phosphate or a borate which may contain a hydrocarbon group.

2. The curable composition as claimed in claim 1 which comprises the component (A) contained in an amount of 60 to 95% by weight of said composition, the component (B) in an amount not greater than 35% by weight of said composition, and the component (C) in such an amount that the total amount of the components (A), (B) and (C) is 100% by weight.

3. The composition as claimed in claim 1, wherein the equivalent weight ratio of the active hydrogen atom-containing group in said active hydrogen compound to the blocked isocyanate group in said blocked polyisocyanate (A) is 0.5 to 1.5.

4. The composition as claimed in claim 1, wherein said polyisocyanate is an isocyanate-terminated polyurethane prepolymer derived from an organic polyisocyanate and a polyol.

5. The composition as claimed in claim 4, wherein the number-average molecular weight of said polyurethane prepolymer is 500 to 10,000.

6. The composition as claimed in claim 4, wherein said polyurethane prepolymer has an isocyanate group content of 1 to 20% by weight.

7. The composition as claimed in claim 1, wherein the blocking agent is an oxime compound, a lactam compound or a phenol compound.

8. The composition as claimed in claim 1, wherein the amount of said catalyst (C) used is 0.01 to 5% by weight based on the weight of the composition.

9. The composition as claimed in claim 1, wherein said $Y^-$ in the general formula (1) is a carboxylate anion which may have a hydrocarbon group.

10. The composition as claimed in claim 1, wherein said $Y^-$ in the general formula (1) is an octanoate anion.

11. The composition as claimed in claim 1, wherein said $Y^-$ in the general formula (1) is a formate anion.

12. The composition as claimed in claim 1, wherein said catalyst (C) is a quaternary ammonium organic carboxylate obtained by reacting a tertiary amine with a carbonic acid diester followed by reacting the resulting quaternary ammonium carbonate with an organic carboxylic acid.

13. The composition as claimed in claim 12, wherein said tertiary amine is selected from the group consisting of trimethylamine, triethylamine, 1,5-diazabicyclo[4,3,0]-5-nonene, 1,8-diazabicyclo[5,4,0]-7-undecene and 1,2,4-trimethylimidazoline.

14. The composition as claimed in claim 12, wherein said organic carboxylic acid is an aliphatic monocarboxylic acid.

15. The composition as claimed in claim 14, wherein said aliphatic monocarboxylic acid is formic acid or octanoic acid.

16. The curable composition as claimed in claim 1, which comprises said blocked polyisocyanate compound (A), said active hydrogen compound (B) and a catalyst component consisting essentially of said catalyst (C).

17. The curable composition as claimed in claim 1, consisting essentially of said blocked polyisocyanate compound (A), said active hydrogen compound (B) and said catalyst (C).

18. The curable composition as claimed in claim 1, consisting essentially of said block polyisocyanate compound (A), said active hydrogen compound (B), said catalyst (C), a pigment, a filler and a solvent.

19. The curable composition as claimed in claim 1, consisting essentially of said blocked polyisocyanate compound (A), said active hydrogen compound (B), said catalyst (C), a pigment, a filler, a solvent, and at least one additive selected from the group consisting of leveling agents, anti-sagging agents, anti-foaming agents, surfactants, curing accelerators, anti-cissing agents, pigment dispersing agents and antistatic agents.

* * * * *